May 28, 1935.  E. MENDENHALL ET AL  2,002,915
MOTOR CONSTRUCTION
Filed Sept. 26, 1932    2 Sheets-Sheet 1

INVENTORS:
EARL MENDENHALL,
JUNIUS B. VAN HORN,
CLARENCE J. COBERLY,
By Fred W. Davis
ATTORNEY.

Patented May 28, 1935

2,002,915

UNITED STATES PATENT OFFICE 2,002,915

MOTOR CONSTRUCTION

Earl Mendenhall, Junius B. Van Horn, and Clarence J. Coberly, Los Angeles, Calif.; said Mendenhall and said Van Horn, assignors to Menhorn, Inc., Los Angeles, Calif., a corporation of California Application September 26, 1932, Serial No. 634,912

28 Claims. (Cl. 172—36)

Our invention relates to a novel submersible structure, and more particularly to a submersible electric motor which can be advantageously utilized in pumping wells or in other installations wherein it is desired to use a structure which effectively seals the working parts of the motor from contact with any of the external medium in which the motor is submerged.

It should not be understood, however, that our invention is in all instances limited to a submersible motor, for it is an important object of the invention to provide an enclosing structure which can be submerged in a liquid without danger of this liquid mixing with the medium inside the enclosing structure.

In its preferred embodiment, however, the invention is utilized in conjunction with an electric motor and finds particular utility in conjunction with a deep-well turbine pump. When utilized in this capacity the motor and pump are connected together as an integral unit and lowered into the well.

In such a submersible motor-pump unit it is desirable from a number of standpoints to maintain the pressure inside the motor at a value greater than the pressure of the surrounding medium. Thus, it is desirable to enclose the motor in a shell which is most conveniently formed in sections, and unless the joint between these sections is perfect there is a tendency for leakage to take place. If any leakage should take place into the shell, it is quite possible that the motor will be burned out, such a result being inevitable if the medium in which the motor is submerged is of a conducting nature. By utilizing a pressure inside the shell which is greater than the pressure on the exterior thereof any leakage which takes place will be outward rather than inward and no harm will result.

It is an important object of the present invention to provide a novel structure including a pumping means for maintaining a pressure inside a motor shell which is greater than the pressure of the surrounding medium.

It is a further object of the invention to provide a surge means communicating with the motor shell and which compensates for an increased pressure inside the shell.

It is preferable to fill the motor shell around the motor with a neutral liquid such as an oil having relatively good dielectric properties, this oil lubricating the bearings of the motor and forming a very efficient cooling means therefor. It is, however, essential that all intermixture between the neutral liquid and the surrounding medium be avoided and in accomplishing this result some type of effective seal is necessary at the junction of the motor shaft and the shell. It is moreover desirable that the pressures on opposite sides of such a seal should be substantially equal, especially when the seal is of the fluid-packed type.

It is an object of the present invention to provide a novel form of submersible motor structure in which a seal is utilized at the junction of the shaft and the shell and in which a pressure-transfer means is utilized for transferring pressure between opposite ends of the seal, and in which the pressure inside the motor is maintained greater than the pressure of the surrounding medium.

It is a further object of the invention to provide a novel structure for controlling the differential pressure existing between the interior and exterior of the motor shell, as well as to provide several novel structures by which this differential pressure can be established.

Another object of the present invention is to provide a submersible motor structure including a novel junction box for carrying the electric current into the motor shell.

Still further objects of the invention lie in the provision of a novel circulation system inside the shell for cooling the motor, and for removing from the neutral liquid any foreign particles which may be carried thereby.

Other objects of the invention lie in the novel enclosing structure for the motor and in an extremely simple system for clamping the motor shell in place which permits the motor itself to be first assembled and the motor shell to be subsequently secured in place.

Still further objects of the invention lie in the details of construction utilized, while still further objects and advantages of the invention will be evident to those skilled in the art from the following description.

In the drawings we have illustrated several embodiments of the invention.

Figures 1, 3, 4, 5, 6:
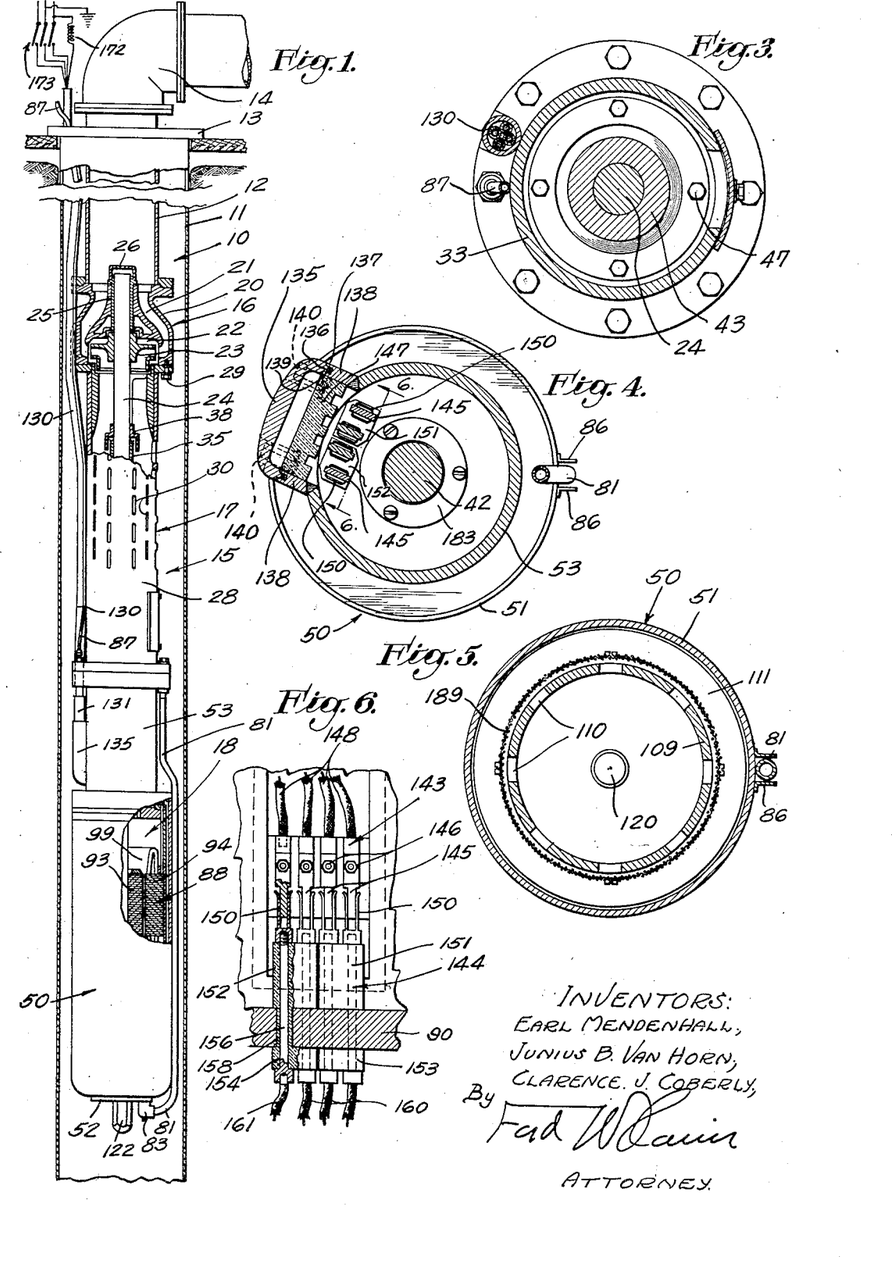
Fig. 1 is a utility view illustrating the preferred embodiment of the invention in conjunction with a deep-well turbine pump.
Figs. 3, 4, and 5 represent horizontal sectional views taken on corresponding lines of Figs. 2a and 2b.
Fig. 6 is a sectional view, partially broken away, of the contact structure and is taken substantially as indicated by the line 6—6 of Fig. 4.

Referring particularly to Fig. 1 we have illustrated a well 10 including a well casing 11 with a discharge pipe 12 extending downward therethrough and being suspended from the surface of the ground as by a flange 13, the upper end of the discharge pipe being connected to a discharge elbow 14. The lower end of the discharge pipe 12 serves to support a motor-pump unit 15 which comprises a turbine pump 16, a strainer element 17, and an electric motor 18.

The turbine pump 16 is of conventional design and may comprise as many stages as desirable. In Fig. 1 we have illustrated this pump as comprising a single bowl 20 provided with the conventional discharge passages 21 communicating between an impeller chamber 22 and the interior of the discharge pipe 12. An impeller 23 of conventional design is positioned in the impeller chamber 22 and is secured to a pump shaft 24 which is suitably journalled in an upper bearing 25. A cap 26 extends over the upper end of the pump shaft in protecting relationship with this bearing.

The strainer element 17 may conveniently comprise a length of pipe 28 secured to the bowl 20 as by bolts 29. A series of perforations 30 formed in this pipe 28 allows water or other well liquid to enter this strainer element and move upward into the turbine pump 16.

Figures 2A, 2B:
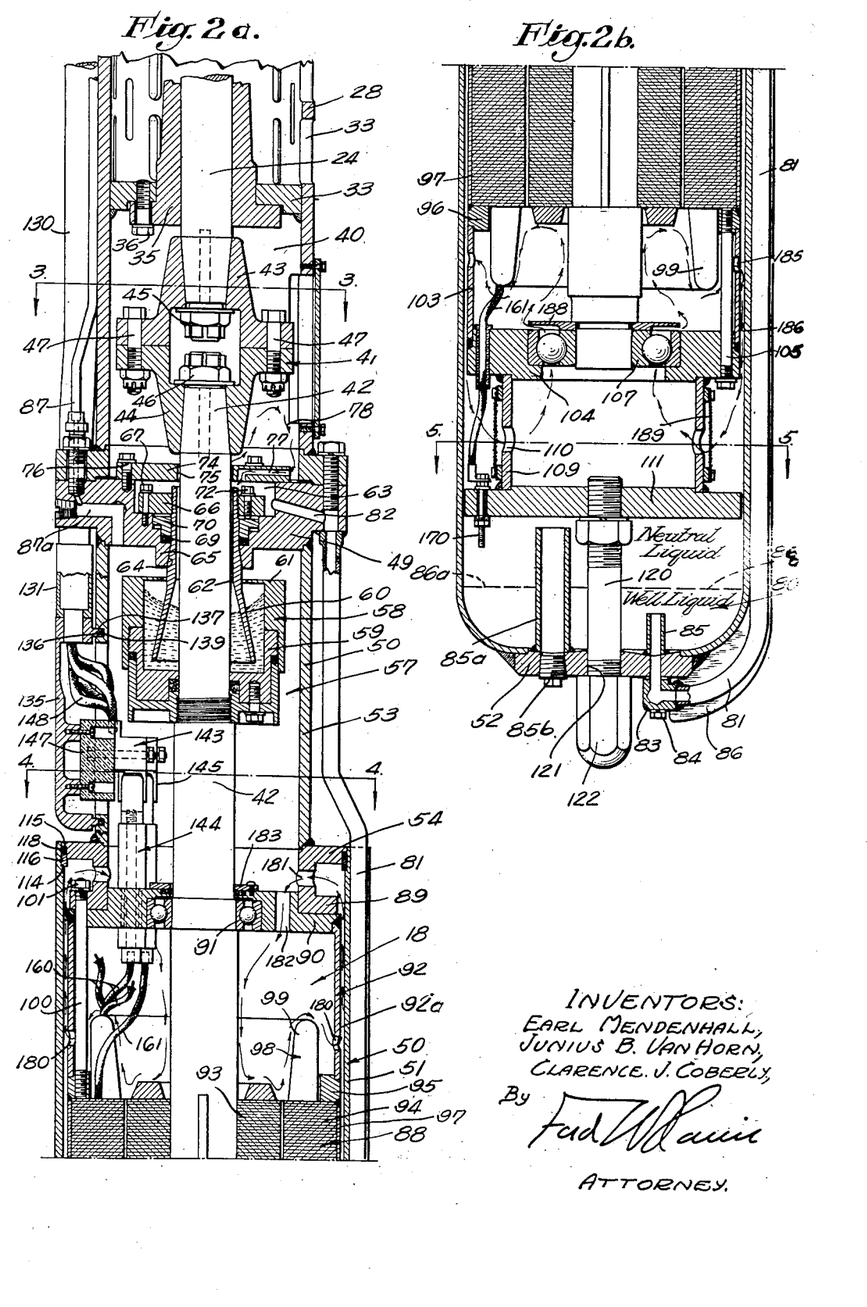
Figs. 2a and 2b represent a foreshortened vertical sectional view of the preferred embodiment in conjunction with an electric motor, Fig. 2a illustrating the upper end of the structure, and Fig. 2b illustrating the lower end thereof.

As best shown in Fig. 2a, an inner flange 33 is welded or otherwise secured in the pipe 28 below the perforations 30 and provides a central opening in which a lower bearing 35 is secured as by cap screws 36, this bearing journalling the lower end of the pump shaft 24 and extending upward therearound throughout a substantial portion of the length of the pipe 28. As best shown in Fig. 1, the upper end of this bearing is protected by an inverted cup 38 suitably secured to the shaft 24 and extending downward around the uppermost portion of the bearing 35 in spaced relationship therewith. This cup 38 thus prevents sand from entering the upper end of the bearing 35 though it permits water or other surrounding medium to rise therein and flow downward between the journalling surfaces to enter a pumping chamber 40 defined below the flange 33.

A pumping means 41 is positioned in the pumping chamber 40 and develops a pressure which is greater than the pressure of the surrounding medium. Any suitable pumping means may be utilized, but in the preferred embodiment we have found it desirable to make this pumping means serve an additional purpose of interconnecting the pump shaft 24 and a motor shaft 42 which extends downward into the motor 18. Thus, in Fig. 2a we have shown two flanges 43 and 44 respectively secured to the shafts 24 and 42 as by nuts 45 and 46. These flanges are in turn secured together by any suitable means such as bolts 47.

The shaft 42 extends downward into the motor 18 and through a central opening of an intermediate wall 49 which may conveniently form a part of a motor shell 50. Any suitable form of motor shell may be utilized, but in the preferred embodiment of the invention we prefer to utilize a sectional shell including a cylindrical shell 51, a bottom wall 52 closing the lower end of this cylindrical shell, an auxiliary shell 53, the intermediate wall 49, and a head member or wall 54 joining the cylindrical shell 51 and the auxiliary shell 53. With this construction the auxiliary shell 53 is preferably of smaller diameter than the cylindrical shell 51 and is welded or otherwise secured at opposite ends to the intermediate wall 49 and the head member 54. It will be understood, however, that this portion of the motor shell 50 can be made unitary rather than in sections without departing from the spirit of the invention.

The intermediate wall 49 and the auxiliary shell 53 define a seal chamber 57 containing a seal 58 adapted to seal the junction of the shaft 42 and the intermediate wall 49 of the motor shell 50. This seal may be of any type which will effectively seal this junction and prevent admixture of the media in the pumping chamber 40 and inside the motor shell. It is usually desirable to completely fill the upper end of the motor shell with a neutral liquid, such as the oil previously described, and if the submersible motor is used in pumping a water well, it is essential that the water, which may be present in the pumping chamber 40, should not enter the interior of the motor shell so as to come in contact with the electrical apparatus therein. A fluid-packed seal has been found to serve this purpose most effectively, and one type of such a seal is disclosed in Fig. 2a, several of the details of this seal being shown and claimed in our copending applications Serial 225,182, filed October 10, 1927, and Serial 544,792, filed June 16, 1931. In the form shown, this seal provides a cup 59 suitably secured in fluid-tight relationship with the shaft 42 so as to rotate therewith. This cup retains a body of sealing liquid such as mercury. A baffle 60 extends into the cup 59 and below the surface of the sealing liquid, and a cap 61 extends across the upper end of the cup 59 and the baffle, terminating short thereof to provide an annular space through which the neutral liquid may enter that portion of the cup 59 which lies outside the baffle 60, this neutral liquid contacting the surface of the sealing liquid in the outer portion of the cup. The baffle 60 is of larger diameter than the shaft 42 to provide an annular space 62 therebetween.

The upper end of the baffle 60 is secured in fluid-tight relationship with the intermediate wall 49 and extends into an auxiliary chamber 63 thereof. The mode of securing this baffle in place is novel, an intermediate section of the baffle 60 being tapered to correspond to the taper of a bore 64 of a collar 65 depending from the intermediate wall 49. The upper end of the baffle 60 is threaded to receive a nut 66 which in turn engages the bottom wall of the auxiliary chamber 63. By tightening the nut 66 the baffle is moved upward and the tapered portion thereof is wedged in the tapered bore 64 and centralized with respect to the shaft 42 and the cup 59. A screw 67 may be threaded through the nut 66 to lock this nut with respect to the intermediate wall 49. To insure a fluid-tight joint we prefer to counterbore the intermediate wall 49 to form a packing chamber in which a packing 69 is positioned, and to provide a gland 70 extending into this packing chamber and sliding relative to the baffle 60 to compress the packing 69 against the external surface of this baffle. A plurality of bolts 72 may be threaded through the nut 66 and into engagement with the gland 70 to adjust the position thereof and thus adjust the sealing action of the packing 69.

The upper end of the auxiliary chamber 63 is separated from the pumping chamber 40 by a throttle means in the form of a control member or wall 74 providing a central opening through which the shaft 42 passes to define an annular throttle passage 75 which communicates between the auxiliary chamber 63 and the pumping chamber 40. Cap screws 76 extend through the control member 74 and into the intermediate wall 49 to centralize the control member with respect to the shaft. The pumping chamber 40 and the auxiliary chamber 63 are in communication through another passage means 77 which may conveniently be formed through the control member 74. In the preferred embodiment of the invention we prefer to drill a number of holes in the control member extending radially inward from the outer periphery, and to drill upward extending holes intersecting with these radial holes and opening on the auxiliary chamber 63, as best shown in Fig. 2a. The pumping chamber 40 and the auxiliary chamber 63, together with the intercommunicating passages, cooperate in defining what will be hereinafter referred to as a pressure chamber.

The pumping means 41 sets up a circulation in the pressure chamber, as indicated by arrows 78, so that the water or other medium in the pumping chamber 40 will move outward and will flow inward through the passage means 77 and into the auxiliary chamber 63, returning to the pumping chamber 40 through the annular throttle passage 75. It will be noted that the passage means 77 is of relatively large cross-sectional area as compared to the area of the annular throttle passage 75. Thus, the pressure in the auxiliary chamber 63 may be made substantially equal to the discharge pressure of the pumping means 41. In fact, the control member 74 serves as a very convenient means for controlling the pressure in the auxiliary chamber 63, for the annular control passage 75 throttles the liquid returning to the pumping chamber. It is usually desirable to utilize a pumping means 41 which will develop a pressure in excess of the desired differential pressure between the interior and exterior of the motor shell, and to form the annular throttle passage 75 of such size that the desired pressure is maintained in the auxiliary chamber 63, this pressure being usually several pounds per square inch or more above the pressure of the surrounding medium.

It is at once clear that the pressure in this auxiliary chamber will be transmitted through the annular space 62 between the baffle and the shaft and will act upon the surface of the sealing liquid between the baffle and the shaft. In order to prevent displacement of this sealing liquid it is desirable that the pressure inside the motor shell and acting upon the liquid in the outer portion of the seal be substantially equal to the pressure in the auxiliary chamber 63, though exact equalization is not always essential. In accomplishing this end we utilize a pressure transfer means acting between the auxiliary chamber 63 and the interior of the motor shell, and in the preferred embodiment of the invention, this pressure-transfer means takes the form of a balance chamber 80 in the lower end of the motor shell 50, together with an intercommunicating means in the form of a pipe 81. This pipe extends exterior of the cylindrical shell 51 and communicates with the auxiliary chamber 63 through a bore 82 formed in the intermediate wall 49. This pipe also communicates with the balance chamber 80 through an elbow 83 secured to the bottom wall 52 as by a bolt 84 and through a nipple 85 extending upward from the bottom wall 52 to a position above the bottom of the balance chamber 80 so as never to become clogged by sediment which might accumulate in the bottom of the balance chamber. This pipe 81 is protected by protecting members 86, best shown in Fig. 2b and Fig. 4, which are suitably secured to the cylindrical shell and extend outward beyond the pipe 81 so that contact between the motor 18 and the well casing 11 will not collapse this pipe. A drain pipe 85a may be used, this pipe extending upward in the balance chamber to a point above the nipple 85 and being closed by a plug 85b. When this plug is removed the neutral liquid can be drained from the shell without danger of contamination with the surrounding liquid present in the lower portion of the balance chamber.

It will thus be clear that the medium in the pumping chamber 40 has access to the balance chamber 80. If the unit is utilized for pumping water from a well, the pumping chamber 40 and the lower end of the balance chamber 80 may contain bodies of the water, the upper portion of the balance chamber being filled with the neutral liquid which fills the upper end of the motor shell 50. The two liquids are shown as being in contact at a surface 86a. While we have disclosed this pressure transfer means as comprising a balance chamber in which is positioned contacting bodies of two liquids, it should be understood that other pressure transfer means may be utilized even though such pressure transfer means do not effect exact equalization of pressures. It is only necessary that the pressures on opposite sides of the baffle 60 of the seal 58 be maintained sufficiently close to each other to prevent disruptive displacement of the sealing liquid.

With such a balance system, it is possible to fill the motor chamber with the neutral liquid before the unit is submerged, either completely filling the balance chamber 80 and the pipe 81 with this neutral liquid or filling the lower end of the balance chamber with a body of the water or other liquid. If this is done, no additional neutral liquid need be added. We have found it preferable, however, to incorporate in this balance system a means for supplying additional neutral liquid to the motor. To this end a relatively small pipe 87 extends upward along the discharge pipe 12 to the surface of the ground, or at least to a level above the liquid in which the motor is submerged. This pipe 87 communicates with the interior of the motor shell 50 through a passage 87a in the intermediate wall 49. It will be clear that a portion of the neutral liquid will tend to rise in this pipe through the action of the pressure-transfer means. If the pressures inside and outside the motor shell are equal, and if the upper end of the pipe 87 is open to the atmosphere, it will be clear that a neutral liquid will rise therein to a level substantially the same as the level of the well liquid, any difference in level being due to the difference in density between the well liquid and the neutral liquid. If, however, the pressure inside the motor shell is greater than the pressure outside thereof due to the action of the pumping means 41, the neutral liquid will rise a further distance in the pipe 87 corresponding to the differential pressure between the interior and exterior of the motor shell 50. It is, however, not necessary that the upper end of the pipe 87 be open to the atmosphere. If this pipe is capped a body of air will be entrapped in the upper end thereof which will be compressed or expanded with change in level of the neutral liquid in the pipe 87. In any event, the neutral liquid will rise in this pipe until equilibrium conditions obtain.

If additional neutral liquid is supplied to the upper end of the pipe 87, it will flow downward into the motor shell and displace a portion of the liquid therein. By supplying sufficient additional neutral liquid, it is possible to lower the surface of contact 86a in the balance chamber to a point opposite the upper end of the nipple 85 after which the pipe 81 and the pumping chamber 40 will receive a portion of the neutral liquid discharged. Unless a large excess of the neutral liquid is supplied, any of this liquid which moves through the pipe 81 will rise to the upper end of the pumping chamber 40 and gradually work its way into the well between the shaft 24 and the bearing 25. It is, however, possible to supply sufficient neutral liquid to the structure to completely fill the pipe 81 and the pumping chamber 40 with this neutral liquid, in which event the pumping means 40 will act to pump the neutral liquid itself. In practice, however, it has been found necessary to supply additional small quantities of neutral liquid only at long intervals of time.

This pressure system is an extremely flexible one and is entirely fool-proof. If an excess of neutral liquid is supplied, it is automatically discharged as previously set forth. In addition, this system automatically compensates for increase in volume of the neutral liquid due to heat developed by the motor. Finally, if through any cause the volume of neutral liquid in the motor shell should decrease, or if leakage should take place, the balance chamber will compensate for this change. It is at once apparent that the pipe 87 is of very small cross-sectional area as compared to the cross-sectional area of the balance chamber 80 so that a very slight change in position of the surface of contact 86a between the liquids in the balance chamber will cause a large change in level of the neutral liquid in the pipe 87. It is thus not necessary to utilize an extremely long balance chamber. It will further be clear that the pipe 87 operates with the pressure transfer system in providing a surge means which compensates for the change in pressure and volume effected by the operation of the pumping means 41, it being clear that as the pumping means 41 comes into play the pressure inside the motor shell 50 increases, and a portion of the neutral liquid rises in the pipe 87 to compensate for the additional pressure developed by the pumping means 41.

A motor 88, preferably of the squirrel-cage induction type, is positioned in a motor chamber of the motor shell 50 by a novel structure which will now be described. Referring particularly to Fig. 2a, the head member 54 includes a flange 89 contacted by a bearing plate 90 carrying a bearing 91, preferably of the ball or roller type, which journals the shaft 42. Depending from this bearing plate 90 is an upper baffle 92 of smaller diameter than the cylindrical shell 51 so as to provide a cooling space 92a therebetween. The motor 88 includes a rotor 93 and a stator 94, this stator including a plurality of laminations clamped together between rings 95 and 96, these rings being in turn secured to a stator casing 97 which surrounds the laminations but which is of slightly smaller diameter than the cylindrical shell 51. The stator 94 is provided with a winding 98 which includes exposed portions 99 extending from the laminations of the stator in the usual manner. The lower end of the baffle 92 extends downward in the space between the exposed portion 99 and the cylindrical shell 51 and contacts the ring 95. A plurality of studs 100 are threaded into the ring 95 and extend upward inside the baffle 92 and through the bearing plate 90 and the flange 89, a nut 101 serving to clamp these members as a unit so that the stator 94 is suspended from the head member 54.

At the lower end of the stator 94 is positioned a similar baffle 103 which extends into the space between the lower exposed portion 99 of the stator winding 98 and the cylindrical shell 51 to contact the ring 96. A lower bearing plate 104 is secured to the lower end of the baffle 103, and this bearing plate and baffle are clamped to the lower ring 96 by a plurality of studs 105. The bearing plate 104 carries a thrust bearing 107 which is preferably of the roller or ball type.

Welded or otherwise secured to the lower bearing plate 104 is a perforated member 109 providing openings 110 therethrough and carrying a lower wall 111 thereon. This head defines the upper end of the balance chamber 80 and is of slightly smaller diameter than the cylindrical shell 51 so that the balance chamber is in communication with the upper interior of the motor shell through a small annular space between the lower wall 111 and the cylindrical shell 51.

It will thus be clear that the operating parts of the motor 88 are suspended from the head member 54, and do not rely upon the cylindrical shell 51 to retain them in correct relation. It is, of course, not necessary to utilize the identical sectional structure described, it being only essential to provide a motor frame which is supported independently of the cylindrical shell 51. The motor frame in the preferred embodiment comprises the members 90, 91, 95, 97, 96, 103, 104, 109, and 111.

After the motor frame is secured in place to the head member 54, the cylindrical shell 51 can be slid upward around the motor until it engages the head member 54. It is necessary to form a fluid-tight joint between the cylindrical shell and this head member, and this can be done in any one of a number of ways. In the preferred embodiment the upper end of the cylindrical shell 51 is counterbored to provide a shoulder 114, the head member 54 providing an outward extending lip 115 of such diameter as to slide in this counterbore. An annular ring 116 is positioned in the counterbore and engages the shoulder 114, this ring extending into the space beneath the lip 115 and engaging a packing 118 positioned in this space. As the cylindrical shell 51 is moved upward with respect to the head member 54 the packing 118 is thus compressed. Such an upward movement of the cylindrical shell is effected by the use of a stud 120 threaded or otherwise secured to the lower head 111 and extending downward through an opening 121 in the wall 52. The lower end of this stud is also threaded to receive a nut 122 which engages the exterior of the wall 52. When the nut 122 is tightened, the cylindrical shell 51 is forced upward with respect to the frame of the motor, and hence moves upward with respect to the head member 54 to compress the packing 118 as previously described. It will at once be apparent that this structure is an extremely desirable one in that the elements of the motor itself can be completely assembled and wired before the cylindrical shell 51 is moved into place. Thereafter the complete enclosure can be made fluid-tight by the adjustment of a single nut. Any tendency toward leakage at the junction of the stud 120 and the bottom wall 52 is relatively unobjectionable as opposite ends of this junction are contacted by the same liquid. Of course this leakage must not be so large as to destroy the differential pressure built up by the pumping means 41.

Current is supplied to the motor 88 through a novel junction box, best shown in Figs. 2a, 4, and 6. In the preferred embodiment a four-conductor cable 130 extends downward along the discharge pipe and through a channel formed in the intermediate wall 49. The lower end of this cable extends into a sleeve 131 and sealed with respect thereto by a suitable insulating compound so as to form a fluid-tight joint. The sleeve 131 is in turn secured to a cover member 135 which provides a tongue 136 extending into a groove 137 formed in outward extending portions 138 of the auxiliary shell 53. This groove contains a packing 139 which is compressed therein when bolts 140 (see Fig. 4) are tightened, these bolts extending through the cover member 135 and being threaded into the outward extending portions 138. These outward extending portions 138 are utilized so that the groove 137 may lie in a single plane rather than being formed in the arcuate surface of the auxiliary shell 53 itself.

A primary contact means 143 is carried by the cover member 135 and is adapted to engage a secondary contact means 144 when the cover member is secured in place. In the preferred embodiment the primary contact means comprises four blades 145 each of which is secured by a bolt 146 to an insulation block 147 fixed to the cover member 135. The four conductors of the cable 130, indicated by the numeral 148, are respectively connected to the blades 145. The secondary contact means 144 comprises four pairs of clips 150, one of the blades 145 extending between the clips of each pair. These clips in turn rest upon two blocks of insulating material 151 and 152 which engage the bearing plate 90. Similar blocks of insulating material 153 and 154 engage the opposite sides of the bearing plate, and studs 156 extend through these blocks of insulating material and are threaded into the clips 150 to retain the secondary contact means 144 in fixed relation with the bearing plate 90. Each of the studs 156 is bushed with an insulating sleeve 158 where it passes through the bearing plate 90.

Three conductors 160 are respectively connected to three of the studs 156 and extend to the stator winding 98. A fourth conductor 161 is connected to the remaining stud 156 and extends through the stator 94 into a position therebelow, being connected to an electrode 170 extending through the lower head 111 but insulated therefrom. This electrode extends into the balance chamber 80 and serves as a control means for indicating to the operator the existence of a condition which would cause the surface of the contact 86a in the balance chamber 80 to rise to such an extent that the electrode 170 contacts the water or other liquid in the lower end of the balance chamber. Suitable control means may be electrically connected in this circuit. In Fig. 1 we have shown a trip coil 172 of a main switch 173, this trip coil being connected in series with the electrode 170. Should the water or other liquid in the balance chamber come into engagement with the electrode 170, current will flow from ground through this electrode and through the coil 172. Such an energization of this coil can be made to trip the switch 173 in a well-known manner. Such a control system is shown and claimed in a copending application Serial No. 524,494, filed March 23, 1931.

It will thus be clear that the connections to the junction box and to the motor can be independently made, and upon positioning the cover member 135 in place the primary and secondary contact means come into engagement. At the same time the cover member 135 closes and seals the opening in the auxiliary shell 53 through which the primary contact means 143 extend. Another important feature of this construction is that the cylindrical shell 51 protects the cover member 135, this being made possible by positioning the engaging face providing the groove 137 a distance inward from the cylindrical shell 51. This can most easily be accomplished by utilizing an auxiliary shell 53 which is of smaller diameter than the cylindrical shell 51, but any structure whereby this engaging face is closer to the axis of the shaft than is the cylindrical shell 51 will be effective, for the cylindrical shell will extend adjacent the outer surface of the cover member 135 in protecting relationship and to prevent engagement between the cover member and the well casing 11.

The invention also includes a novel circulating system best shown in Figs. 2a and 2b. In the space above the motor the rotation of the rotor 93 throws the stream of the neutral liquid outward into contact with the exposed portion 99 of the stator winding, this stream moving upward toward the end of this exposed portion and thereafter flowing through openings 180 formed in the baffle 92. These openings are formed between the stator 94 and the end of the exposed portion 99 so that the stream must flow downward a distance along the outer surface of this exposed portion in order to reach the openings 180. In this way the stream is caused to circulate along two sides of the exposed portion 99. This stream of neutral liquid then moves into the cooling space 92a, and in flowing upward therein it is cooled by the medium surrounding the motor shell 50. Thereafter the stream of neutral liquid flows through ports 181 of the head member 54 and thence downward through ports 182 formed through the bearing plate 90, thus completing a closed circulation path. A cap structure 183 may be provided above the bearing 90 to prevent a large flow of this circulating liquid therethrough, and also to prevent any solid particles from reaching this bearing.

The circulation system below the motor is substantially the same, the rotor 93 moving a stream of the neutral liquid outward and around the lower exposed portion 99 of the winding 98, this stream then moving through openings 185 of the baffle 103, and flowing downward in a cooling space 186 between the baffle and the cylindrical shell 51, this stream then flowing inward through the openings 110 of the perforated member 109, and moving upward through the bearing 107. A rotating plate 188 above the bearing 107 serves to increase this circulation and also to protect the bearing 107.

It is often advantageous to position a filtering means in the circulation path thus set up. Such a means is shown in Fig. 2b as comprising a filter 189 of annular shape and surrounding the perforated member 109 so that the neutral liquid circulated through the openings 110 must first move through the filter. This filter is designed to remove any foreign material from the neutral liquid, and may be of such characteristic as to filter any water particles therefrom. Such a filter may be formed of fine mesh screen or cloth.

The present application discloses a structure which is an improvement over the structures disclosed in the copending joint applications of Earl Mendenhall and Junius B. Van Horn as follows: Serial No. 231,513, filed November 7, 1927, and Serial No. 245,307, filed January 29, 1928, disclosing in conjunction with a different system of balancing pressures certain of the features herein disclosed; Serial No. 634,908, filed September 26, 1932, Serial No. 634,911, filed September 26, 1932, and Serial No. 1520, filed January 2, 1935, disclosing and claiming combinations including superimposed chambers in systems in which substantial pressure equalization is maintained on the seal; Serial No. 634,909, filed September 26, 1932, disclosing an unequalized-pressure system for maintaining a pressure differential on the seal; and Serial No. 524,494, filed March 23, 1931, disclosing and claiming a control system utilizing an electrode in the balance chamber as is shown but not claimed in the present application.

We claim as our invention:

1. In a submersible electric motor structure, the combination of: a shell positioned in a surrounding medium; a motor in said shell; a shaft on said motor extending from said shell; a sealing means sealing the junction of said shaft and said shell; walls defining an auxiliary chamber communicating with said sealing means; pump means for building up a pressure in said auxiliary chamber which is greater than the pressure of said surrounding medium, said pump means being operatively connected to said shaft and circulating liquid into and from said auxiliary chamber; a throttle means for throttling the flow of said liquid through said auxiliary chamber to regulate the pressure therein; and a pressure transfer means communicating with said auxiliary chamber and with the interior of said shell for building up a pressure in said interior of said shell substantially equal to the pressure in said auxiliary chamber.

2. In a submersible electric motor structure, the combination of: walls adapted to be submerged in a surrounding medium and defining a motor chamber, an auxiliary chamber and a pumping chamber, said walls including an intermediate wall separating said motor and auxiliary chambers and a control wall separating said pumping chamber and said auxiliary chamber, said intermediate and control walls defining central openings; a motor in said motor chamber; a shaft on said motor extending through said central openings; a sealing means sealing the junction of said intermediate wall and said shaft; pump means in said pumping chamber and operatively connected to said shaft, there being a passage bounded by said control wall and conducting liquid pumped by said pump means into said auxiliary chamber, said liquid returning to said pumping chamber through an annular throttle space between said shaft and the walls of said central opening of said control member, said throttle space being sufficiently small to build up a pressure in said auxiliary chamber greater than the pressure of said surrounding medium; and pressure transfer means communicating with said pump means and with said motor chamber for maintaining in said motor chamber a pressure greater than the pressure of said surrounding medium.

3. In a submersible electric motor structure, the combination of: a shell positioned in a surrounding medium and defining a motor chamber; a motor in said chamber; walls defining a pressure chamber above said motor chamber, said walls including a central opening; a shaft on said motor and extending upward into said pressure chamber; means around said shaft for sealing said motor chamber from said pressure chamber; a pump means operatively connected to said shaft in said pressure chamber and comprising a shaft coupling rotating with said shaft for increasing the pressure in said pressure chamber to a value above the pressure of said surrounding medium; and pressure transfer means communicating between said pressure chamber and said motor chamber.

4. In a submersible electric motor structure adapted to be submerged in a well, the combination of: a shell defining a motor chamber and providing an opening therein; an electric motor in said motor chamber and providing a winding therein; a cover member closing said opening; means detachably securing said cover member to said shell in fluid-tight relationship; primary contact means carried by said cover member and insulated therefrom; secondary contact means mounted in said shell adjacent said opening and with which said primary contact means is engageable when said cover member is secured in place over said opening; means electrically connecting said winding and said secondary contact means whereby current is supplied to said motor; and conductors associated with said cover member and connected to said primary contact means.

5. A combination as defined in claim 4 in which said motor shell comprises a cylindrical shell in which said motor is positioned, and in which said motor shell includes a face through which said opening is formed and adjacent which said cover member is secured, said face being spaced inward from the outermost portion of said cylindrical shell to provide a space in which said cover member is positioned when in place whereby said cover member does not extend materially beyond said cylindrical shell and is protected thereby when said motor structure is being lowered in place.

6. In a submersible electric motor structure, the combination of: a motor frame; a stator mounted in fixed relation with said frame; a rotor rotatably mounted in said frame adjacent said stator; a cylindrical shell surrounding said motor frame; means for connecting one end of said cylindrical shell in fluid-tight relationship with said motor frame; a wall closing the other end of said cylindrical shell; and inter-engaging means extending between said wall and said motor frame for holding said cylindrical shell in place.

7. In a submersible electric motor structure, the combination of: a head member; a motor frame extending from said head member and secured thereto; a stator and a rotor carried by said frame; a cylindrical shell around said motor frame and extending adjacent said head member; sealing means between said head member and said cylindrical shell and against which said cylindrical shell bears; and means for moving said cylindrical shell relative to said motor frame to compress said sealing means therebetween.

8. In a submersible electric motor structure, the combination of: a head member; a motor frame extending from said head member and secured thereto; a stator carried by said frame; a cylindrical shell around said motor frame and extending adjacent said head member; sealing means between said head member and said cylindrical shell and against which said cylindrical shell bears; a wall closing that end of said cylindrical shell opposite said head member; and interengaging means extending through said wall and engaging that end of said motor frame which is removed from said head member for moving said cylindrical shell relative to said motor frame to compress said sealing means therebetween.

9. In a submersible electric motor structure, the combination of: a motor shell submerged in an external liquid and providing a motor chamber and a balance chamber, said balance chamber containing a body of said external liquid, said motor shell including a wall closing one end thereof and separating the external liquid in said balance chamber from the external liquid around said motor shell said wall including an opening; a motor frame in said shell; an electric motor including a rotor and a stator, said stator being secured to said motor frame; and means extending through said opening for clamping said motor shell and said frame together.

10. In a submersible structure, the combination of: a shell positioned in an external liquid and defining a chamber and a balance chamber in communication with each other, said chamber containing a body of neutral liquid; a shaft extending from said shell; walls defining an auxiliary chamber around said shaft; sealing means sealing said auxiliary chamber from said chamber; pipe means communicating between said balance chamber and said auxiliary chamber and extending therebetween at a position outside said shell; and means extending along said shell to a position beyond said pipe means for protecting said pipe means.

11. In a submersible motor structure, the combination of: a motor shell containing a neutral liquid and positioned in a surrounding medium; a motor in said shell, there being a circulation chamber in said motor shell at one end of said motor; means for circulating said neutral liquid in said circulation chamber in cooling relation with said motor and along the inner surface of said motor shell whereby said neutral liquid flows through a closed circulation path in said circulation chamber; and a filter means transversely interposed in said path and through which said neutral liquid flowing in said circulation path is forced to remove foreign substances therefrom.

12. In a submersible electric motor structure, the combination of: a shell positioned in a surrounding medium and defining a motor chamber containing a neutral liquid; a stator in said motor chamber; a winding on said stator and providing an exposed portion extending from one end of said stator and spaced from said shell; a baffle inside said shell and cooperating with the inner wall thereof in defining a cooling space, said baffle extending into the space between said shell and said exposed portion of said stator winding and being spaced from said exposed portion of said stator winding to define a channel therebetween, said baffle bounding a passage means positioned in said space and between said stator and the end of said exposed portion and communicating with said channel; and means for flowing a stream of said neutral liquid around the end of said exposed portion, said stream being guided by said baffle means to flow through said channel, said passage means and said cooling space, said stream being heated by flowing along said exposed portion of said stator winding and being cooled in said cooling chamber by a flow of heat through said shell and to said surrounding medium.

13. A combination as defined in claim 4 in which said conductors are enclosed in a cable extending upward in said well, and including means for sealing said cable and said cover member in fluid-tight relationship.

14. In a submersible electric motor, the combination of: walls defining a motor chamber and a pressure chamber thereadjacent; a motor in said motor chamber; a shaft associated with said motor and extending from said motor chamber into said pressure chamber; a seal around said shaft and separating said motor chamber and said pressure chamber, one portion of said seal communicating with said pressure chamber and another portion of said seal communicating with said motor chamber; pump means for setting up a closed circulation of liquid in said pressure chamber whereby the pressure on said one portion of said seal is controlled by the pressure of said liquid thus circulated by said pump means; and a pressure-transfer means communicating with said liquid thus circulated and transferring pressure to said motor chamber and thus to said other portion of said seal.

15. In a submersible structure adapted to be submerged in a surrounding medium, the combination of: walls defining a chamber containing a body of a neutral liquid; a shaft extending from said chamber; a seal for sealing the junction of said shaft and said walls; walls defining a pressure chamber at one end of said chamber and communicating with said surrounding medium and containing a liquid; means for setting up a circulation of said liquid in said pressure chamber, said liquid circulating in a closed path therein; a pressure-transfer means communicating with said first-named chamber and controlling the pressure on said neutral liquid therein; walls forming a space communicating with said liquid flowing in said closed circulation path and with one end of said seal; and walls defining a space communicating with said liquid flowing in said closed circulation path and with said pressure-transfer means whereby the pressure on said neutral liquid is controlled by the pressure existing in said liquid flowing in said closed circulation path.

16. A combination as defined in claim 14 including a throttle means through which said liquid flowing in said closed circulation path must pass, said throttle means controlling the pressure to which said seal is subjected.

17. In a submersible motor structure, the combination of: a motor frame; a stator carried by said motor frame; a rotor rotatably mounted in said motor frame; a shaft rotated by said rotor; a wall associated with one end of said motor frame and through which said shaft extends; a cylindrical shell open at one end and closed at the other and adapted to be positioned around said motor frame; and means for connecting the open end of said shell and said wall in fluid-tight relationship.

18. In a submersible electric motor structure, the combination of: a stator; a baffle extending from each end of said stator each baffle bounding one or more openings; a pair of plate means respectively extending across the outer ends of said baffles; means for securing said stator, said baffles, and said plate means together to form a frame means carrying said stator, there being a wall at one end of said frame means; a shell of greater size than said baffles and cooperating therewith in defining a cooling space therebetween, said shell extending along said frame means; means for closing one end of said shell; means for connecting the other end of said shell in fluid-tight relationship with said wall; and means for circulating a cooling medium through said openings of said baffles and through said cooling spaces.

19. In a submersible motor structure adapted to be submerged in a surrounding liquid, the combination of: a shell including an upper wall; a shaft means extending upward from said shell through said wall; an electric motor in said shell and driving said shaft means; a seal at the junction of said shaft means and said upper wall; walls forming a chamber above said upper wall; and a bearing means associated with said walls forming said chamber and through which bearing means said shaft means extends upward and into said surrounding liquid whereby said surrounding liquid has access to said chamber through the space between said bearing means and said shaft means.

20. A combination as defined in claim 19 including a perforated pipe surrounding said bearing means and through which must pass any of said surrounding liquid entering said chamber through said space between said bearing means and said shaft means.

21. In a submersible structure, the combination of: a shell; a wall extending across one end of said shell and providing an opening therethrough; a rotatable shaft extending through said opening but spaced from the wall thereof; a baffle providing an end extending completely through said opening and positioned around said shaft; means on the side of said wall from which said end of said baffle extends for moving said baffle into engagement with said wall; and a cup means rotating with said shaft and containing a body of sealing liquid into which said baffle extends.

22. A combination as defined in claim 21 including a packing means between said baffle and said wall.

23. In a submersible structure, the combination of: a shell defining a chamber and including an end wall providing an opening therethrough, said opening including a tapered portion; a rotatable shaft extending from said chamber through said opening, said shaft being of smaller diameter than said opening to define an annular space therebetween; a baffle including an end extending into said annular space and providing a tapered portion engaging said tapered portion of said opening; means for forcibly moving said end of said baffle into said opening to seat said tapered portions of said opening and said baffle; and a cup means associated with said shaft and into which said baffle extends, said cup retaining a body of sealing liquid into which said baffle extends.

24. In a submersible motor structure, the combination of: a shell construction divided intermediate its ends and including a shell and an auxiliary shell axially aligned with each other and including means at one end of said shell construction and spaced from the adjacent ends of said shells for moving said shell and said auxiliary shell toward each other to provide a fluid-tight joint between the adjacent ends of said shell and said auxiliary shell to separate the interior of said shell construction and the liquid in which said shell construction is submerged, thereby preventing entrance through said joint of any of said liquid, said shell construction including a motor chamber therein; a motor in said motor chamber; a shaft associated with said motor and extending from said shell construction; and sealing means at the junction of said shaft and said shell construction.

25. In a submersible electric motor structure adapted to be submerged in an external liquid, the combination of: a motor shell containing a neutral l'quid; an electric motor in said shell; a shaft associated with said electric motor and extending from said shell; means for effectively sealing the junction of said shaft and said shell to prevent entrance of external liquid through said junction; pumping means for establishing a closed circulation of said neutral liquid in said motor shell to move a portion of said neutral liquid through a closed path; and filter means spaced from said shaft and interposed in said closed path and through which said neutral liquid is forced to remove foreign substances therefrom, the discharge of said pumping means being transmitted to one side of said filter means and the intake of said pumping means communicating with the other side of said filter means to move said neutral liquid through said filter means.

26. In a submersible motor structure, the combination of: a shell containing a body of neutral liquid therein, the lower end of said shell providing a balance chamber containing pressure transferring bodies of said neutral liquid and an external liquid separated at a surface of contact; a motor in said shell and providing a shaft extending therefrom; a seal for sealing the junction of said shaft and said shell; and pipe means extending upward into said balance chamber and providing an open end spaced intermediate the upper and lower ends of said balance chamber whereby change in the relative amounts of said neutral and external liquids in said balance chamber may move said surface of contact adjacent said open end thereby changing the liquid in said balance chamber with which said open end of said pipe communicates.

27. In combination in a submersible electric motor: an electric motor including a stator and a rotor; a shaft extending vertically upward from said rotor; support means suspending said stator and said rotor therebelow, said support means including a wall; a cylindrical shell providing an upper open end and a lower closed end and adapted to be moved upward around said motor until the upper end of said cylindrical shell engages said wall; and means for connecting the upper end of said shell and said wall in fluid-tight relationship.

28. In combination in a submersible electric motor adapted to be submerged in an external liquid: a vertical-axis motor including a rotor and a stator; frame means supporting said rotor and said stator, said frame means including a lower wall below said stator: means for supporting said frame means at its upper end; and a cylindrical shell closed at its lower end and open at its upper end and adapted to be moved upward around said motor, said lower wall of said frame means dividing the interior of said shell when said shell is in place into a motor chamber in which said motor is positioned and a balance chamber therebelow, said motor chamber containing a body of internal liquid, the upper end of said balance chamber containing a body of said internal liquid, the lower end of said balance chamber containing a body of said external liquid in pressure-transferring relationship with said body of internal liquid therein, said lower wall bounding a relatively small passage means through which said body of internal liquid in said motor chamber is in communication with said body of liquid in the upper end of said balance chamber whereby the turbulence set up in said motor chamber by operation of said motor is not transmitted to said balance chamber due to the relatively small passage means connecting these chambers.

EARL MENDENHALL.
JUNIUS B. VAN HORN.
CLARENCE J. COBERLY.